Figures 1, 4:
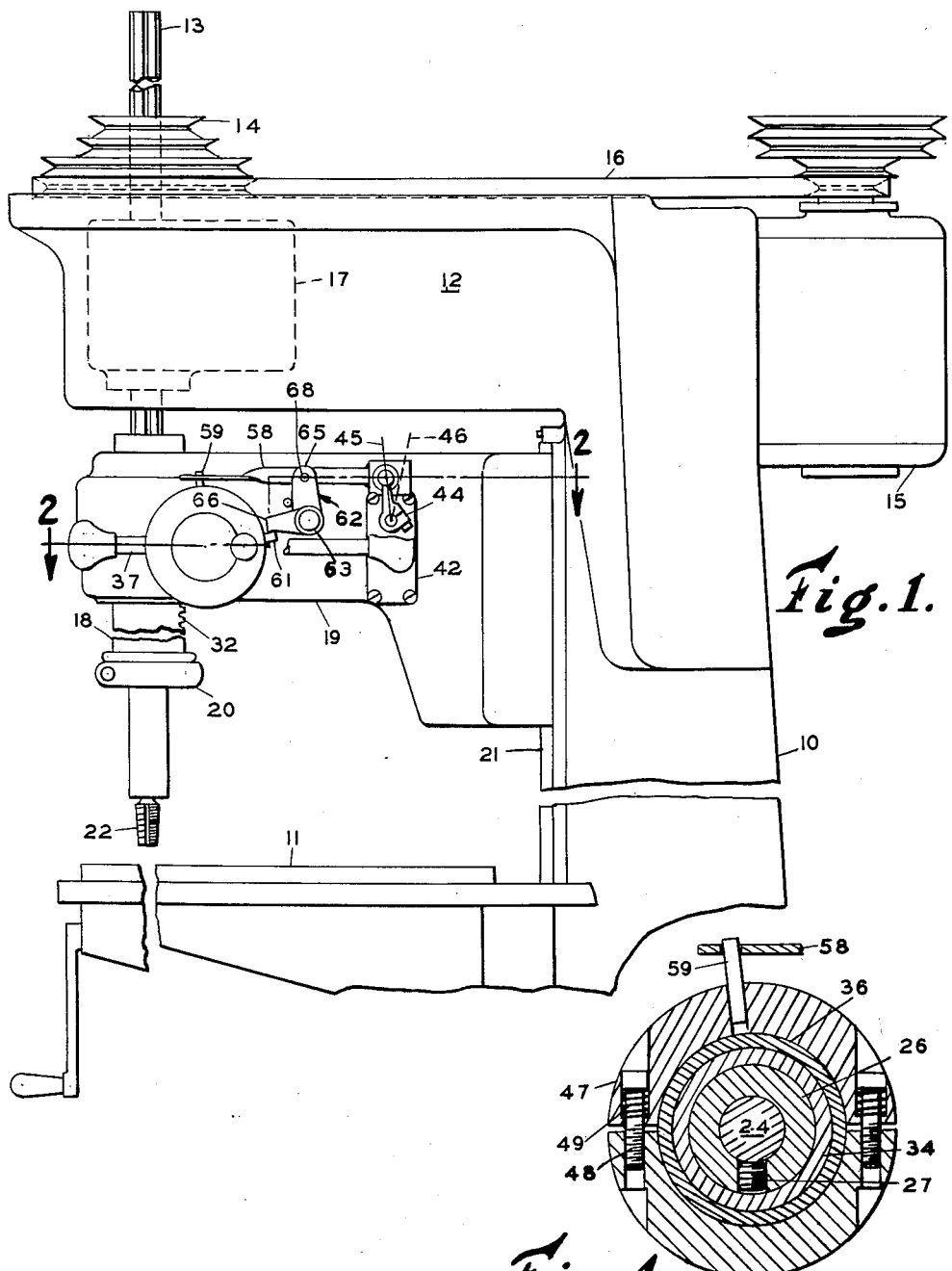

INVENTOR.
HERBERT R. UHTENWOLDT

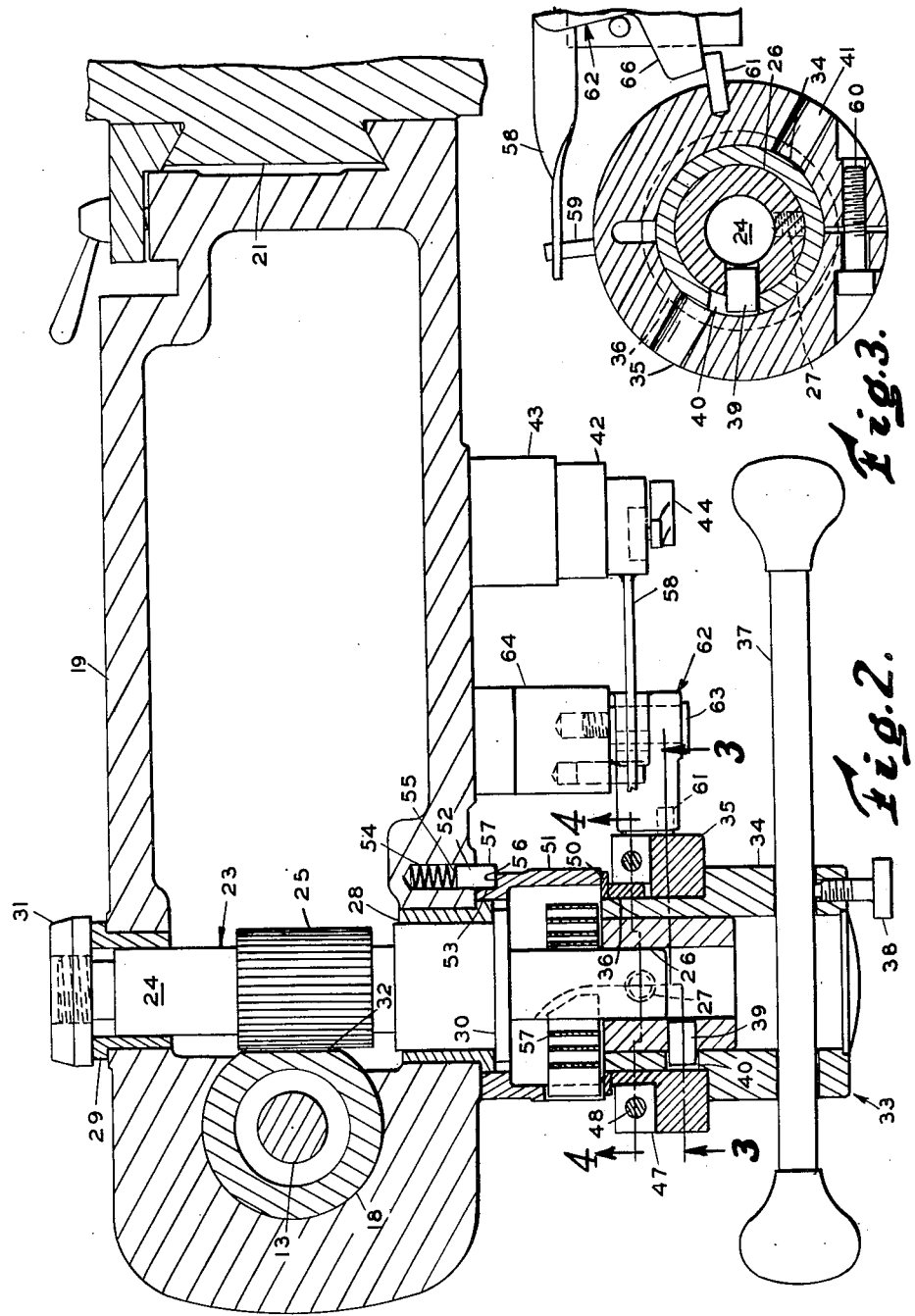

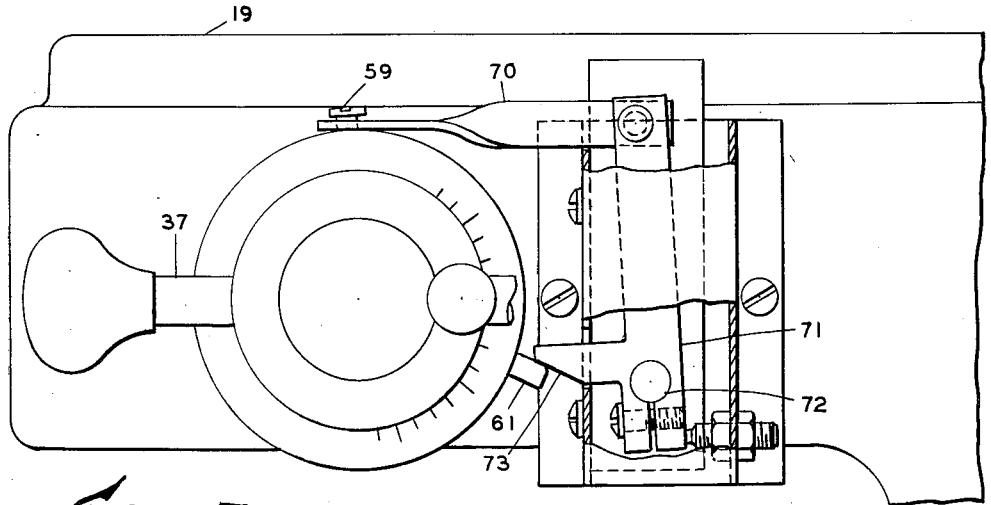
Fig. 5.
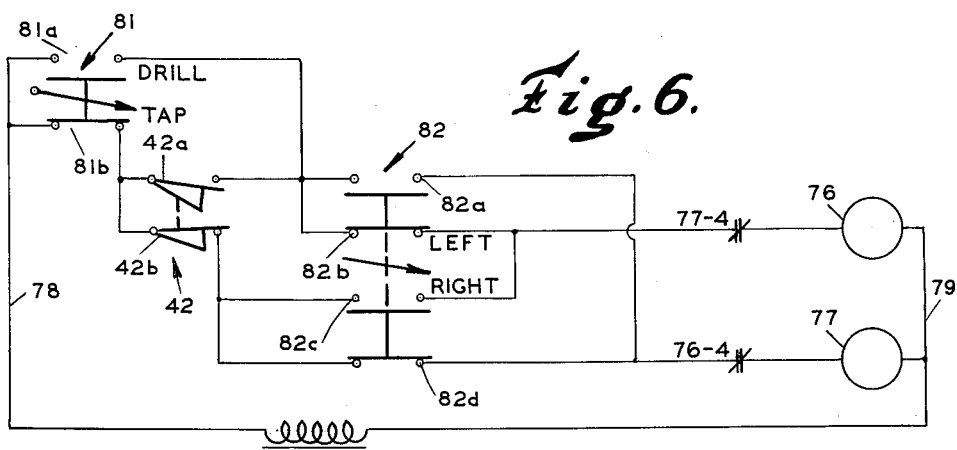
Fig. 6.
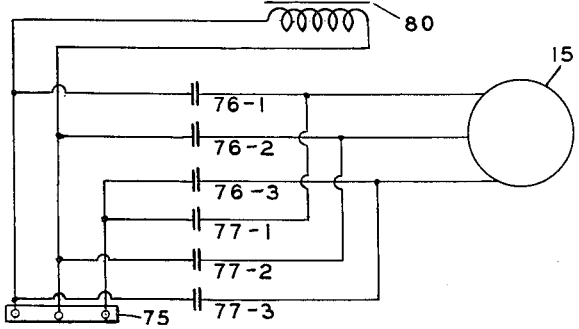

United States Patent Office
3,021,539
Patented Feb. 20, 1962

3,021,539
TAPPING SPINDLE REVERSING MEANS SELECTIVELY ACTUATED AUTOMATICALLY OR MANUALLY BY QUILL ACTUATING MEMBER
Herbert R. Uhtenwoldt, Wilmington, Ohio, assignor to The Cincinnati Milling Machine Company, Cincinnati, Ohio, a corporation of Ohio
Filed May 31, 1960, Ser. No. 32,670
2 Claims. (Cl. 10—136)

The present invention relates to a tapping mechanism for a machine tool in which the tapping tool is fed down to the workpiece manually, and more particularly to a control mechanism therefor.

After a tap has become engaged in a workpiece, the direction of rotation of the tap must be reversed to withdraw the tool. In some operations, such as tapping relatively deep blind holes, it is desirable that the tap automatically reverse direction of rotation after it has reached a predetermined depth, while in other operations, such as tapping holes in thin gage material, a more rapid tapping operation can be effected if the reversal of rotation of the tap is not preset but, instead, is under the control of the operator. Even in those operations where the limit of longitudinal travel of the tap into the work is preset, it is desirable that the operator be able instantly to reverse the direction of rotation of the tap at any time before the preset limit is reached in the event of some unforeseen difficulty.

When the tapping tool must be lowered to the work manually by actuation of a handle, an independently operated control for reversal of the rotation of the tap makes it difficult for the operator to terminate the tapping operation instantly and begin withdrawal of the tap. To overcome this difficulty, in the present invention, the control to effect revesal of the rotation of the tapping tool is automatically operated by the handle with which the tool is moved longitudinally to the work. In brief, the handle through which the spindle is moved to the workpiece is operatively connected to the quill in which the rotatable spindle is mounted with a limited amount of lost motion between the handle and the quill. Thus when the tap is engaged in the workpiece, and rotating in a thread cutting direction deeper into the workpiece, the handle can nevertheless be reversely actuated by the operator a small amount by virtue of the lost motion in the connection between the handle and the quill. The control member which determines the direction of the rotation of the spindle and tap is operatively connected to the handle in a manner to reverse the control member whenever the handle is reversely actuated, regardless of the position of the handle or quill. This reverses the direction of rotation of the tap to terminate the thread cutting and initiate withdrawal of the tap from the workpiece.

Novel means are also provided, in the event a tapped hole of predetermined depth is desired, automatically to reverse the tap when that depth is reached. There is also provided means to preselect the initial direction of rotation of the tap so that either a left hand or right hand thread may be cut.

It is therefore one object of the present invention to provide a mechanism with which the direction of rotation of a tapping tool is reversed by operation of the handle which effects longitudinal movement of the tool.

It is another object of the present invention to provide a simple, effective tapping mechanism which is operated and controlled by a single handle to instantly terminate tapping operations and begin withdrawal of the tool.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:
FIG. 1 is a view in elevation of a machine tool having the tapping mechanism of the present invention;
FIG. 2 is a view taken on the line 2—2 of FIG. 1;
FIG. 3 is a view taken on the line 3—3 of FIG. 2;
FIG. 4 is a view taken on the line 4—4 of FIG. 2;
FIG. 5 is a fragmentary elevational view, oriented as FIG. 1, showing an alternate construction;
FIG. 6 is a schematic electrical diagram of the machine tool of FIG. 1.

There is shown in FIG. 1 a drilling machine having an upstanding column 10, a workpiece supporting table 11 mounted on the column, and a horizontally extending overarm 12 on top of the column which receives the vertically oriented spindle 13. A sheave 14 is rotatably mounted in the overarm and driven by a reversible electric motor 15 mounted on the rear of the column through a belt 16. The spindle 13 may be splined in the sheave 14 for rotation thereby, or may be splined in the output end of a gear reduction unit 17 driven by the sheave 14. The spindle is rotatably mounted in a quill 18 in a conventional manner for longitudinal movement therewith. The quill 18 is slidably received in a head 19 and extends therethrough, upward movement of the quill relative to the head being limited by a collar 20 secured on the lower end of the quill. The head 19 is clamped to the vertical way 21 on the column 10 for vertical adjustment to a suitable position above a workpiece on the table 11.

Vertical movement of the quill 18, and hence the spindle 13 which carries the tap 22 at its lower end, is effected through a quill actuating member, indicated generally at 23 as shown in FIG. 2, comprising a shaft 24, a pinion 25 at one end of the shaft and integral therewith, and a sleeve 26 received on the opposite end of the shaft and clamp thereto by set screw 27. The quill actuating member 23 is rotatably supported in bushings 28 and 29 received in opposite sides of the head, and thrust collar 30 and thrust nut 31 on the member 23 engage outer flanges on these bushings to prevent lateral shifting of the member 23. The pinion 25 engages a rack 32 on the quill so that rotation of the quill actuating member 23 in a counterclockwise direction (as viewed in FIG. 1) will lower the spindle toward the workpiece and rotation thereof in the opposite direction will raise the spindle from the workpiece.

Rotation of the quill actuating member 23 is effected through a hub member 33 comprising a sleeve 34 received on the sleeve 26 of member 23, a second sleeve comprising a collar 35 and a skirt portion 36 received on the sleeve 34, and a manually rotatable handle 37 extending through the sleeve 34 and secured therein by set screw 38. The connection of the hub member 33 to the quill actuating member 23 has a limited amount of lost motion so that the hub member 33 can be rotated through a small angle relative to the quill actuating member 23. This lost motion connection is accomplished by a pin 39, secured in the sleeve 26, which extends into a circumferentially extending slot 40 in the sleeve 34. Opposite radial holes 41 are provided in collar 35 to permit insertion and removal of pin 39. Thus, a limited movement of the handle 37 can be made without a corresponding longitudinal movement of the quill 18, while rotation of the handle 37 beyond the predetermined limits defined by the extent of the slot 40 will move the quill longitudinally.

The reversible electric motor 15 has a switch 42 associated therewith mounted on a base 43 connected to head 19. The switch has an arm 44 shiftable between a first extreme position, as shown in FIG. 1 and indicated at 45, to drive the motor in one direction and a second, or opposite, extreme position, indicated at 46, to drive the motor in the opposite direction. A switch actuating split ring 47 is received over the skirt portion 36, the two halves of the split ring connected by bolts 48 and urged together into slidable gripping relation with skirt 36 by springs 49 received under the heads of bolts 48. The ring is adjusted on skirt 36 by bolts 48 so that the frictional engagement between the ring 47 (and hence the link and switch arm connected thereto) and the skirt portion 36 of hub member 33 will cause the ring to rotate with the skirt portion when the ring is unrestrained, but so that skirt portion 36 can be rotated relative to ring 47 when ring 47 is restrained.

One end of an annular member 51 is received over the outer flange of bushing 28, the opposite end thereof being engaged with washer 50 abutting against skirt portion 36. A pin 52 is received in a blind bore 54 in the head 19 and is urged into one of a plurality of notches 53 in the periphery of member 51 by spring 55 in bore 54. The annular member 51 serves as a housing for coil spring 57 received on shaft 24. The spring 57 has its inner end engaged with the shaft and its outer end engaged in member 51 and thereby normally holds the shaft in the angular position where the quill is raised with its collar 20 engaging the underside of the head 19. The torque exerted on shaft 24 by spring 57 can be adjusted by depressing plunger 52 and rotating housing 51 until the desired torque is achieved, the pin 52 engaging the notch 53 opposite the bore 54 when the housing is in the desired angular position.

A rigid link 58 is connected at one end by pin 59 to the outer periphery of ring 47 and is connected at its other end to the outer end of switch arm 44. With this construction it will be seen that rotation of the handle 37 in one direction or the other will shift the switch arm 44 in one direction or the other. After the switch has been shifted to one of its extreme positions by rotation of the handle 37 in one direction, rotation of the handle in that direction can be continued, despite the fact that the switch arm 44 cannot move beyond its extreme position and thus restrains the ring 47 through link 58, since the hub member 33 can rotate relative to the switch actuating ring 47.

The collar 35 is split and the skirt portion 36 thereof is connected to one side only of the collar so that the collar, which during operation of the device is secured in nonrotatable relation to the sleeve 34 by bolt 60, can be loosened and angularly adjusted relative to sleeve 34. The collar 35 has a radially outwardly extending pin 61 secured in its outer margin. A bell crank lever 62 is pivotally connected at 63 to block 64 which is connected to the head 19. The bell crank lever 62 has one arm 65 pivotally connected to link 62 at 68 and a trip arm 66 terminating adjacent collar 35 positioned for engagement by pin 61. Thus the collar 35 can be secured on sleeve 34 in a selected angular position relative thereto with the pin 61 an angular distance from lever arm 66 corresponding to the distance that the tool is to be lowered. After the tool has been longitudinally moved this distance the pin 61 will shift switch arm 44 through bell crank 62 and link 58 to reverse the motor and retract the tool.

Thus, it will be seen that the switch arm can be actuated, to reverse the spindle motor for retraction of the tool from the work, either by preset pin 61 after a predetermined downward movement of the quill, or by pin 59 upon manual clockwise rotation of handle 37 if it is desired to withdraw the tool before the preset limit of movement is reached. The switch arm, instead of being actuated by the linkage shown in FIG. 1, can be directly connected to pin 59 and directly engaged by pin 61, or, as shown in FIG. 5, can have a short link 70 connecting the pin 59 to the upper end of the switch arm, designated as 71 in this alternate embodiment. This switch arm is pivoted at 72 for movement between two extreme positions, as switch arm 44, and has an extending trip arm 73 positioned for engagement by pin 61.

As shown in FIG. 6 the spindle motor 15 is energized from a source of power 75 for rotation in one direction when the normally open contacts 76—1, 76—2, and 76—3 of relay 76 are closed by energization of that relay, and for rotation in the opposite direction when, alternately, the normally open contacts 77—1, 77—2, and 77—3 of relay 77 are closed by energization of that relay. The lines 78 and 79 are connected to the secondary of a transformer 80 energized from the source of power 75. Connected between lines 78 and 79 are selector switch 81, having pairs of contacts 81a and 81b for selection between drilling and tapping operations, selector switch 82 having pairs of contacts 82a, 82b, 82c, and 82d for selection of left hand or right hand rotation of the tool, relays 76 and 77, and switch contacts 42a and 42b connected and disconnected by actuation of switch arm 44 (or 71).

If, as shown in FIG. 6, contacts 81b, 82b, and 82d are closed for a right hand tapping operation, rotation of handle 37 in a counterclockwise direction (as viewed in FIG. 1) to lower the quill toward the work will put switch arm 44 in position 45, closing contacts 42b and relay 77 will be energized through the closed contacts 81b, 42b, 82d and normally closed contacts 76—4 of relay 76. As relay 77 is energized contacts 77—1, 77—2 and 77—3 will be energized to drive the motor in the desired direction. At this time relay 76 is deenergized. When switch arm 44 is tripped, either by pin 61 after a predetermined downward movement of the quill or by a limited clockwise rotation of handle 37 by the operator, contacts 42b will open and 42a will close. This will deenergize relay 77, opening contacts 77—1, 77—2, and 77—3 and closing contacts 77—4, and energize relay 76 through contacts 81b, 42a 82b, and 77—4, closing contacts 76—1, 76—2, and 76—3 to reverse motor 15. If a left hand tapping operation were selected contacts 82a and 82c would be closed and contacts 82b and 82d open, and when the switch arm 44 is shifted to position 45 (closing contacts 42b) to begin downward movement of the quill, relay 76 would be energized through contacts 81b, 42b, 82c and 77—4. On actuation of switch arm 44 to position 46, contacts 42a would close and contacts 42b would open to deenergize relay 76, opening contacts 76—1, 76—2 and 76—3 and closing contacts 76—4, and relay 77 would be energized through contacts 81b, 42a, 82a, and 76—4. Energization of relay 77 closes contacts 77—1, 77—2, and 77—3 to reverse motor 15.

The selection of drill operation, which opens contacts 81b and closes contacts 81a, cuts switch 42 out of the circuit and the tool is rotated in the same direction when retracted from the tool as when advanced toward the tool, the direction of rotation depending upon which of the contacts 82a or 82b are closed.

From the above description it will be seen that the hub member 33 (and hence handle 37) is frictionally engaged with the switch arm (44 or 71) through ring 47, pin 59, and linkage (58 or 70) so that on initial counterclockwise rotation of hub member 33 (as viewed in FIG. 1) by handle 37, the switch is shifted to the extreme postion 45, turning the tool in the desired direction. The lost motion between hub member 33 and quill actuating member 23 (which members are connected through the pin 39 and the elongated slot 40) is taken up by this initial counterclockwise rotation of hub member 33. When in its extreme position the switch arm restrains the ring but since the ring embraces skirt portion 36 of hub member 33 loosely enough to permit sliding rotation of skirt portion 36 relative to ring 47, continued counterclockwise rotation of hub member 33 can be effected. When the lost motion between the hub member 33 and quill actuating member 23 is taken up the quill actuating member 23, which is positively connected with the quill 18 and hence the spindle 13 carried thereby, is rotated in the counter-clockwise direction by counterclockwise rotation of handle 37 and tapping tool 22 can be brought into the work. The pin 61 of hub member 33 is preset before the operation is begun (by angular adjustment of collar 35) in a predetermined angular relation to sleeve 34 so that after a predetermined rotation of the hub member (bringing the tapping tool 22 to a predetermined depth in the workpiece) switch arm 44 is tripped by pin 61 to position 46 to reverse the motor 15 and retract the tool from the work. When the tool leaves the workpiece the spring 57 raises the tool to its upper position where quill collar 20 engages head 19.

However, if it is desired to terminate tapping and retract the tool before the preset depth is reached, this can be quickly effected by actuation of the handle 37 with which the tool is brought into the work. Despite the fact that the quill actuating member 23 can not be rotated in the clockwise direction to raise the quill while the tool is engaged in the work and the tap is turning in the selected tapping direction, the hub member 33 can be given a limited clockwise rotation relative to quill actuating member 23 because of the lost motion connection between these members. The frictional engagement between the hub member 33 and the switch arm (44 or 71) shifts the switch arm to its opposite extreme position to reverse the motor 15 which turns the tool. This retracts the tool from the work and, as in downward movement of the quill, the skirt portion 36 of hub member 33 slides relative to ring 47 after the ring is restrained by the switch arm 44 reaching its opposite extreme position.

What is claimed is:

1. In a machine tool having a longitudinally movable quill, a spindle rotatably mounted in the quill, and a reversible motor operatively connected to the spindle to rotate the same, the combination of a control member operatively connected to the motor and having a movable member shiftable between extreme positions to reverse the direction of rotation of the spindle, a quill actuating member engaged with the quill and rotatable for longitudinal movement thereof, a hub member including a handle and a collar rotatable therewith, said collar rotatably adjustable relative to said handle, motion transmitting means connecting said hub member to the quill actuating member, said motion transmitting means having a limited amount of lost motion therein, means frictionally connecting said control member to the hub to shift said control member on reverse rotation of the handle, and means to shift said movable member of the control member after a predetermined rotation of said collar.

2. In a machine tool having means to support a workpiece, a quill movable longitudinally towards and away from the workpiece, a spindle rotatably mounted in the quill, and a reversible electric motor operatively connected to the spindle to rotate the same, the combination of a switch operatively connected to the motor having a switch arm to effect rotation of the motor in one direction when in one extreme position and to effect rotation of the motor in the reverse direction when in the opposite extreme position, a rotatable quill actuating member engaged with the quill for longitudinal movement thereof, a rotatable hub member including a handle and a collar rotatable therewith, said collar rotatably adjustable relative to the handle, motion transmitting means operatively connecting the hub to the quill actuating member to effect movement of the spindle toward the workpiece when the handle is rotated in one direction, said motion transmitting means having a limited amount of lost motion therein to permit a predetermined amount of rotation of the hub relative to the quill actuating member, a link connected to the switch arm frictionally engaged with the hub to shift said switch arm to said one extreme position when the handle is rotated in said one direction and to shift said switch arm to said opposite extreme postion when the hub is reversely rotated said predetermined amount, a trip arm adjacent said collar operatively connected to the switch arm, and means on the collar to trip said trip arm after a predetermined rotation of the hub in said one direction to shift said switch arm to said opposite extreme position.

References Cited in the file of this patent
UNITED STATES PATENTS
2,189,422    Irwin _____ Feb. 6, 1940